(12) United States Patent
Xu et al.

(10) Patent No.: US 7,618,913 B2
(45) Date of Patent: Nov. 17, 2009

(54) HIGHLY ACTIVE ALPHA-OLEFIN COPOLYMERIZATION CATALYST SYSTEM

(75) Inventors: Guangxue Xu, Port Lavaca, TX (US); Honglan Lu, Port Lavaca, TX (US); Chih-Jian Chen, Port Lavaca, TX (US)

(73) Assignee: Formosa Plastics Corporation, U.S.A., Livingston, NJ (US)

( * ) Notice: Subject to any disclaimer, the term of this patent is extended or adjusted under 35 U.S.C. 154(b) by 587 days.

(21) Appl. No.: 11/513,803

(22) Filed: Aug. 31, 2006

(65) Prior Publication Data

US 2008/0058198 A1    Mar. 6, 2008

(51) Int. Cl.
C08F 4/64    (2006.01)
C08F 4/649   (2006.01)
C08F 4/642   (2006.01)

(52) U.S. Cl. .................. 502/123; 502/116; 526/124.2; 526/124.9; 526/125.3

(58) Field of Classification Search ................. 502/116, 502/123; 526/124.4, 124.9, 125.3, 124.2
See application file for complete search history.

(56) References Cited

U.S. PATENT DOCUMENTS

| | | | |
|---|---|---|---|
| 4,076,698 A | 2/1978 | Anderson et al. | |
| 4,260,709 A | 4/1981 | Durand | |
| 4,478,221 A | 10/1984 | Heiss | |
| 4,530,913 A | 7/1985 | Pullukat et al. | |
| 4,842,074 A | 6/1989 | Hines et al. | |
| 5,047,468 A | 9/1991 | Lee et al. | |
| 5,091,353 A | 2/1992 | Kioka et al. | |
| 5,192,731 A | 3/1993 | Kioka et al. | |
| 5,260,245 A | 11/1993 | Mink et al. | |
| 5,336,652 A | 8/1994 | Mink et al. | |
| 5,561,091 A | 10/1996 | Mink et al. | |
| 5,633,419 A | 5/1997 | Spencer et al. | |
| 5,763,349 A | 6/1998 | Zandona | |
| 6,228,792 B1 | 5/2001 | Carney | |
| 2002/0028893 A1 | 3/2002 | Cheng et al. | |
| 2005/0009690 A1 | 1/2005 | Xu et al. | |
| 2006/0019821 A1 | 1/2006 | Xu et al. | |

FOREIGN PATENT DOCUMENTS

| | | |
|---|---|---|
| EP | 0 703 246 A1 | 3/1996 |
| FR | 2.116.698 | 12/1970 |

*Primary Examiner*—Caixia Lu
(74) *Attorney, Agent, or Firm*—Howrey LLP

(57) ABSTRACT

A high activity magnesium-based supported catalyst component useful in a catalyst system for the compolymerization of ethylene and alpha-olefin and a process for preparing the catalyst component is described. In the process, alkoxysilane ester is contacted with a halogen-substituted silane to form an organic silicon complex. Optionally, the organic silicon complex is contacted with an aminosilane compound to form an organic silicon complex containing nitrogen. The organic silicon complex containing nitrogen or the organic silicon complex is contacted with a transition metal compound to form an organic silicon complex containing transition metal. The organic silicon complex containing transition metal is then contacted with a substituted aromatic ring nitrogen compound to form a fourth reaction complex, which is then contacted with a magnesium-based composite support that has been prepared in situ by reacting metallic magnesium with an alkyl or aromatic halide to form the catalyst component.

26 Claims, No Drawings

HIGHLY ACTIVE ALPHA-OLEFIN COPOLYMERIZATION CATALYST SYSTEM

BACKGROUND OF THE INVENTION

1. Field of Invention

The present invention relates to catalyst component supported on magnesium-based medium, methods of preparing the catalyst component, and methods of using the catalyst component in a catalyst system to produce polyolefin, particularly polyethylene, more particularly linear low density polyethylene. More specifically, the present invention relates to a highly active catalyst system capable of producing ethylene/alpha-olefins copolymers, particularly, linear low-density polyethylene, having narrow molecular weight distribution, narrow (or improved) branching compositional distribution, and reduced lower molecular weight component content. Also, the present invention relates to a catalytic process using the catalyst system for producing linear low density polyethylene having good powder flowability, has a high bulk density, and contains a small amount of fine powders.

2. Description of the Related Art

Linear low density polyethylene polymers (LLDPE) have a density of about 0.900 g/cc to about 0.945 g/cc. Preferably, LLDPE has a density that is less than 0.930 g/cc. LLDPE, when compared to other polyethylene polymers, such as homopolymers of polyethylene, possesses advantageous properties. Such properties are described in various references, including U.S. Pat. No. 4,076,698 by Anderson, et al. LLDPE has rapidly increasing commercial importance in commodity and industrial applications including blown and cast films, injection molding, rotational molding, blow molding, pipe, tubing, and wire and cable manufacturing. Intensive research has been directed to development of high performance LLDPE resins having improved impact strength, higher toughness, higher transparency, less low molecular weight component content, and narrower compositional distributions. The catalyst systems are crucial for producing such LLDPE.

Optimizing the properties of LLDPE by varying product molecular weight, molecular weight distribution (MWD), and density is performed to match the required product specifications. Narrowing the MWD, lowering the density of LLDPE, improving branching compositional distribution, and reducing low molecular weight extractable fraction are desirable as the tear strength, impact strength, puncture resistance, toughness, and clarity properties of films from these resins can be much improved. Although the actual molecular weight of a resin can be adjusted by altering process conditions in copolymerization reactions, MWD, density, branching compositional distribution, and low molecular weight extractable fraction of a LLDPE resin are strongly influenced by catalyst composition.

Several catalyst systems have been examined to manufacture LLDPE. Chromium containing catalysts have been examined. Single site catalyst systems employing organometallic compounds and aluminoxane can provide improved control of MWD and branching compositional distributions compared to traditional Ziegler-Natta catalyst systems. To use single site catalyst systems in current industrial scale gas phase processes, the catalyst components are immobilized on a carrier or support, such as silica or alumina. Using supported or heterogeneous catalysts improves reactor operability and ease of handling and increases process efficiencies by forming polymeric particles that have a desirable morphology and density. However, the solubility of organometallic compounds and cocatalysts such as methylaluminoxane (MAO) requires immobilization processes on inorganic supports in systems that are costly. Accordingly, it can be difficult to apply single site catalysts in existing polymerization processes without major process modification and capital investments. So the application of such systems for producing LLDPE has its drawbacks for gas phase processes.

In contrast, advanced Ziegler-Natta catalysts based on supported titanium systems have received recent research interest for producing high performance LLDPE resins, such as Super-Hexene resins. Super-Hexene resins are ethylene/hexene copolymers having narrow molecular weight distributions, uniform compositional distribution, and high performance properties comparable to ethylene-octene copolymers produced by single site catalysts. The advanced Ziegler-Natta catalysts are directly applicable to existing fluidized gas phase processes, without polymerization process modification.

For example, catalysts prepared in-situ by reacting magnesium metal with at least one halogenated hydrocarbon and at least one tetravalent titanium compound have been described. Reacting magnesium metal powder with butyl chloride in a non-polar solvent in the presence of $TiCl_4/Ti(OR)_4$ to form a catalyst for gas phase ethylene co-polymerization has been disclosed. An advantage of this synthesis method for preparing Ziegler-Natta catalyst is to form homogeneous active sites and to simplify preparation procedure. However, these catalysts can show broad particle size distribution as well as poor morphology and poor operability for producing lower density resins, and inferior comonomer incorporation. The LLDPE resins obtained using such catalysts do not have the narrow molecular weight distribution and compositional distribution that are desirable for high performance resins. Moreover, the catalyst composition can not produce LLDPE with a density of less than 0.917 at economically favorable production rates because of poor powder flowability. The poor flowability is caused by resin stickiness, chunk formation, and reactor fouling.

Other supported titanium catalyst systems for LLDPE are obtained by dissolving $MgCl_2$ with $[TiCl_3 (AlCl_3)_{1/3}]$ in tetrahydrofuran (THF) to make a solution containing $MgCl_2$ and titanium halide that is subsequently immobilized on silica support. A process wherein $MgCl_2$ is dissolved in an electron donating solvent and reacted with alkylaluminum compounds to solidify magnesium halide with aluminum alkoxy compounds has also been disclosed. The solid was then contacted with titanium halide to give a solid catalyst with effective co-polymerization ability. However, the preparation of such catalyst systems can require complicated processing steps, and the LLDPE products obtained using these catalyst systems do not possess narrow molecular weight distribution and compositional distribution required for high performance resins. This inadequate molecular weight and compositional distribution presumably exists because of broadly inhomogeneous active sites in such catalyst systems.

Also, a catalyst system in which dialkylmagnesium and silane compounds are reacted with an —OH group on a silica support, which is then contacted with transition metal halide to form a relatively homogeneous active site, has also been disclosed. This silica supported catalyst system exhibits more homogeneous ethylene polymerization or co-polymerization capability than magnesium-based supported titanium halide catalyst systems as measured by resin MWD and compositional distribution. However, such catalyst systems require extra processing steps because the silica support must be treated, either chemically or thermally, to remove bound water and excess —OH groups prior to the formation of the catalyst.

Additionally, catalyst systems in which dialkylmagnesium compounds are impregnated into a silica support containing —OH groups to form a first reaction product have been disclosed. The first reaction product is then halogenated with HCl to convert the organomagnesium derived compound to $MgCl_2$ thereby forming a second reaction product. The second reaction product is then treated with a transition metal halide such as $TiCl_4$, a particular type of electron donor, and at least one Group 2 or 13 organometallic compound such as diethylaluminum chloride. The multi-step process of this catalyst preparation is complicated and is a difficult process to use to provide controlled, stable catalyst quality.

Other art describes a silica supported Ziegler-Natta catalyst system for ethylene polymerization using substituted pyridines as electron donors. The catalyst is the reaction product of a tetravalent titanium halide with —OH group of silica support in the presence of the electron donor. However, the catalyst system is not suitable for producing linear low density polyethylene, because the system has poor comonomer response and branching compositional distribution.

In the prior art, the preparation methods of Ziegler-Natta catalysts described for the catalytic control of molecular weight distribution and/or branching compositional distribution are directed toward complicated tuning art of controlling the active site formation process, which in turn requires careful control of the catalyst precipitation process to ensure consistent catalyst properties and the formation of uniform catalyst active sites. Deteriorated catalyst properties are often present in the absence of control over the precipitation process, especially in multi-step processes.

Therefore, there is a need for a catalyst composition, more especially an advanced Ziegler-Natta alpha-olefin copolymerization catalyst having superior performance including comonomer incorporation, comonomer composition distribution, and molecular weight distribution. It is desirable to devise a magnesium-based catalyst system to produce LLDPE resins of narrow molecular weight distribution and of lower density without reactor fouling at high production rates. It is also desirable to provide a supported catalyst system with high catalyst efficiency to control desired morphology, bulk density, and kinetic characteristics. The supported catalyst system should also minimize resin stickiness, chunk formation, and reactor fouling in the fluid bed gas-phase process. Chunk formation and powder stickiness cause various troubles of operations, and consequently significantly decrease operation efficiency. Therefore, it is desirable to decrease the amount of adhesive materials and chunks. It is further desirable to have a catalyst system that can be prepared by a simple and efficient process.

SUMMARY OF THE INVENTION

In accordance with one embodiment, the present invention provides a process for preparing a catalyst component by:
(i) contacting compound having the formula $R^1_x SiX_y$, wherein $R^1$ is $C_1$-$C_{20}$ hydrocarbyl, X is halogen, x=0-3, y=1-4, and x+y=4, and wherein each X and each $R^1$ may be the same or different, with at least one compound having the formula $R^2_m Si(OR^3)_n$, wherein $R^2$ and $R^3$ are independently $C_1$-$C_{20}$ hydrocarbyl, m=0-3, n=1-4, and m+n=4, and wherein each $R^2$ may be the same or different and each $R^3$ may be the same or different, thereby forming organic silicon complex (A);
(ii) optionally, contacting the organic silicon complex (A) with a compound having the formula $(R^4_2 R^5 Si)_2 NH$ wherein $R^4$ is alkyl or aryl and $R^5$ is cyclic alkyl, and wherein each R4 may be the same of different, thereby forming organic silicon complex containing nitrogen (B);
(iii) contacting the organic silicon complex (A) or the organic silicon complex containing nitrogen (B) with a compound having the formula $Ti(OR^6)_a X_{4-a}$, wherein $R^6$ is $C_1$-$C_{20}$ hydrocarbyl, X is halogen, and $0<a\leq 4$, and wherein each R6 may be the same or different, thereby forming organic silicon complex containing titanium (C);
(iv) contacting the organic silicon complex containing titanium (C) with a compound having the formula

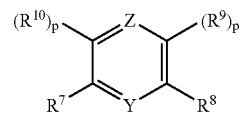

wherein Y is nitrogen, Z is nitrogen or carbon, $R^7$, $R^8$, $R^9$, and $R^{10}$ are independently selected from the group consisting of 2-position substituted aromatic pyridine ring group, 2-position substituted pyrimidine ring group, 2-position substituted pyrazine group, alkyl silane group containing 1 to 20 carbon atoms, alkyl group containing 1 to 20 carbon atoms, aryl group containing 1 to 20 carbon atoms, alkoxy group, haloalkyl group, hydroxyalkyl group, carboxaldehyde group, carboxylic acid group, acetyl, and carboxamide group, and each p independently is 0 or 1, thereby forming fourth reaction complex (D); and
(v) contacting the fourth reaction complex (D) with magnesium-based composite support prepared in-situ by contacting metallic magnesium with alkyl halide or aromatic halide in the presence of fourth reaction complex (D), thereby forming the catalyst component.

In accordance with another embodiment, the present invention provides a catalyst component prepared by such a process of the present invention.

In accordance with another embodiment, the present invention provides a process for polymerizing ethylene and alpha-olefin in the presence of a catalyst component of the present invention that has been activated by contacting the catalyst component with cocatalyst.

DETAILED DESCRIPTION OF THE INVENTION

The present invention relates to catalyst component supported on magnesium-based medium, methods of preparing the catalyst component, and methods of using the catalyst component in a catalyst system to produce polyolefin, particularly polyethylene, and more particularly linear low density polyethylene. More specifically, the present invention relates to a highly active catalyst system capable of producing ethylene/alpha-olefins copolymers, particularly, linear low density polyethylene, having narrow molecular weight distribution, narrow branching compositional distribution, and reduced lower molecular weight component content. Also, the present invention relates to a catalytic process using the catalyst system for producing linear low density polyethylene having good powder flowability, has a high bulk density, and contains a small amount of fine powders.

In accordance with the present invention, the reactions used to prepare the magnesium-titanium based catalyst component are depicted schematically and are described in detail below.

$$R^1{}_xSiX_y + R^2{}_mSi(OR^3)_n \longrightarrow \text{A (organic silicon complex)} \quad \text{Eq. (1)}$$

$$\text{(optional) A} + (R^4{}_2R^5Si)_2NH \longrightarrow \text{B (organic silicon complex containing nitrogen)} \quad \text{Eq. (2)}$$

$$\text{A or B} + Ti(OR^6)_aX_{4-a} \longrightarrow \text{C (organic silicon complex containing transition metal)} \quad \text{Eq. (3)}$$

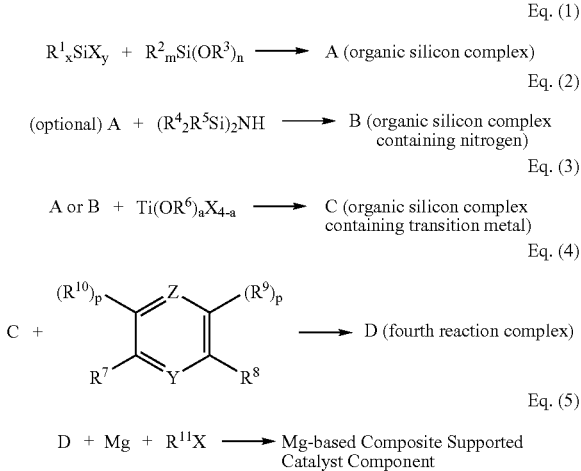

Eq. (4)

$$D + Mg + R^{11}X \longrightarrow \text{Mg-based Composite Supported Catalyst Component} \quad \text{Eq. (5)}$$

Alkoxysilane Ester Reaction with Halogen-Substituted Silane $$R^1{}_xSiX_y + R^2{}_mSi(OR^3)_n \to \text{A (organic silicon complex)} \quad \text{Eq. (1)}$$

Organic silicon complex (A) is prepared by reacting alkoxysilane ester, $R^2{}_mSi(OR^3)_n$, with halogen-substituted silane, $R^1{}_xSiX_y$. The reaction is preferably conducted in the presence of magnesium and halogenated alkyl group, such as alkyl chloride, which, without being limited to this position, is believed to form alkyl magnesium halide. The mixture is heated for about 30 minutes to about 60 minutes, preferably about 45 minutes to 60 minutes, in a non-polar solvent to about 50° C. to about 100° C., preferably to about 65° C. to about 85° C.

The reactions between alkoxysilane ester with halogen-substituted silane such as silicon tetracholoride ($SiCl_4$) are described by M. G. Voronkov, V. P. Mileshevich, and A. Yu in the book "The Siloxane Bond," Plenum Publishing Corp., New York, 1978. The reaction can be carried out in a non-polar solvent by heating the mixture to about 50° C. to about 100° C., preferably to about 65° C. to about 85° C. The duration of heating is not generally critical. One acceptable procedure is to heat for about 30 minutes to about 60 minutes once the desired temperature is obtained. The molar ratio of alkoxysilane ester to halogen-substituted silane is from about 0.5 to about 3.0, and more preferably from about 0.8 to about 1.5. Some percentage of the alkoxysilane ester may remain in excess and thus, not reacted, in the final product organic silicon product. The organic silicon product (A) can be and preferably is used in the next steps in situ without further separation or characterization.

The halogen-substituted silane has the formula $R^1{}_xSiX_y$, wherein $R^1$ is $C_1$-$C_{20}$ hydrocarbyl, which for present purposes includes both unsubstituted and substituted species, including halogen substituted species, X is halogen, x is 0-3, y is 1-4, and x+y=4. More than one hydrocarbyl group $R^1$ may be employed in the halogen-substituted silane, and more than one halogen X may be employed in the halogen-substituted silane. Suitable halogen-substituted silane compounds include silicon tetrachloride, tetrabromosilane, tetrafluorosilane, tetrachlorosilane, allyldichlorosilane, allyltrichlorosilane, benzyltrichlorosilane, bis(dichlorosilyl)methane, 2-bromoethyltrichlorosilane, t-butyldichloro-silane, t-butyltrichlorosilane, 2-(carbomethoxy)ethyltrichlorosilane, 2-chloroethylmethyl-dichlorosilane, 2-chloroethyltrichlorosilane, 1-chloroethyltrichlorosilane, chloromethylmethyldichlorosilane, ((chloromethyl)phenylethyl)trichlorosilane, chloromethyltrichlorosilane, 2-cyanoethylmethyldichlorosilane, cyclohexyl-trichlorosilane, cyclopentyltrichlorosilane, cyclotetramethylenedichlorosilane, cyclo-trimethylene-dichlorosilane, decylmethyldichlorosilane, dibenzyloxydichlorosilane, 1,5-dichlorohexamethyltrisiloxane, (dichloromethyl)trichlorosilane, dichlorosilane, 1,3-dichlorotetramethyldisiloxane, diethoxydichlorosilane, ethylmethyldichlorosilane, ethyltrichlorosilane, heptyltrichlorosilane, hexachlorodisilane, hexachloro-disiloxane, isobutyltrichlorosilane, methyltrichlorosilane, octyltrichlorosilane, pentyltrichlorosilane, propyltrichlorosilane, and trichloromethyltrichlorosilane. It is preferred to employ tetrachlorosilane, allyltrichlorosilane, ethyltrichlorosilane, methyltrichlorosilane, and dichlorodiphenylsilane.

Suitable alkoxysilane ester compounds have the formula $R^2{}_mSi(OR^3)_n$. $R^2$ and $R^3$ are independently any $C_1$-$C_{20}$ hydrocarbyl, which for present purposes includes both unsubstituted and substituted species, including halogen substituted species, m is 0-3, n is 1-4, and m+n=4. More than one hydrocarbyl or substituted hydrocarbyl group may be employed as the $R^2$ component, and more than one hydrocarbyl or substituted hydrocarbyl group may be employed as the $R^3$ component. Suitable alkoxysilane ester compounds include tetramethoxysilane, tetraethoxysilane, tetraisopropoxysilane, tetrapropoxysilane, tetrabutoxysilane, tetraisobutoxysilane, tetraphenoxysilane, tetra(p-methylphenoxy)silane, tetrabenzyloxysilane, tetrakis(2-methoxyethoxy)silane, tetrakis(2-ethylhexoxy)silane, tetraallyloxysilane, methyltrimethoxysilane, methyltriethoxysilane, methyltributoxysilane, methyltriphenoxysilane, methyltriphenoxysilane, ethyltriethoxysilane, ethyltriisobutoxysilane, ethyltriphenoxysilane, butyltrimethoxysilane, butyltriethoxysilane, butyltributoxysilane, butyltriphenoxysilane, isobutyltriisobutoxysilane, vinyl triethyoxysilane, allyltrimethoxysilane, octadecyltrimethoxysilane, octadecyltriethoxysilane, octyltriethoxysilane, phenyltrimethoxy-silane, phenyltriethoxysilane, benzyltriphenoxysilane, methyltriallyloxysilane, dimethyldimethoxysilane, dimethyldiethoxysilane, dimethyldiisopropyloxysilane, dimethyl-dibutoxysilane, dimethyldihexyloxysilane, dimethyldiphenoxy-silane, diethyldiethoxysilane, diethyldiisobutoxysilane, diethyldiphenoxysilane, dibutyldiisopropyloxysilane, dibutyl-dibutoxysilane, dibutyldiphenoxysilane, diisobutyldiethoxysilane, diisobutyldiisobutoxysilane, diphenyldimethoxysilane, diphenyldiethoxysilane, diphenyldibutoxysilane, dibenzyl-diethoxysilane, divinyl diphenoxysilane, diallyldipropoxysilane, diphenyldiallyloxysilane, methylphenyldimethoxysilane, chlorophenyldiethyoxysilane, 1,1,1,3,3-pentamethyl-3-acetoxydisiloxane, triehoxysilane, trimethoxysilane, triethoxychlorosilane, and trimethoxy-chlorosilane. Particularly preferable compounds are tetramethoxysilane, tetraethoxysilane, tetraisopropoxysilane, tetrapropoxysilane, tetrabutoxysilane, tetraisobutoxysilane, and combination thereof.

Organic Silicon Complex (A) Reaction with Aminosilane (Optional Step)

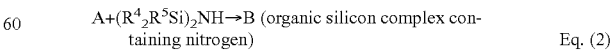

Eq. (2)

In this optional step, organic silicon complex containing nitrogen (B) is prepared by reacting organic silicon complex A with aminosilane, $(R^4{}_2R^5Si)_2NH$. The reaction is preferably conducted at about 75-85° C. The duration of heating is not generally critical. One acceptable procedure is to heat for about 30 minutes to about 60 minutes once the desired temperature is obtained. The molar ratio of $(R^4_2R^5Si)_2NH$ to halogen-substituted silane, as introduced into the system to form complex A that should be added to the organic silicon complex A is preferably from about 0.1 to about 3.0, and more preferably from about 0.1 to about 2.0. The organic silicon complex containing nitrogen B can be used, and preferably is used, for the following steps in situ without further separation or characterization.

The aminosilane has the formula $(R^4_2R^5Si)_2NH$ wherein $R^4$ is an alkyl or aryl group with 1 to 20 carbon atoms and $R^5$ is a cyclic alkyl with 3 to 10 carbon atoms. For present purposes, both $R^4$ and $R^5$ may be unsubstituted or substituted, including halogen-substituted. Each $R^4$ may be the same or different. The aminosilane is a substituted disilazane and/or substituted disilafuran. Specific examples of such compounds are, but are not limited to, 1,1,1,3,3,3-hexamethyldisilazane, 1,1,3,3-tetramethylsilazane, 1,3-divinyl-tetramethyldisilazane, tetramethyldilafuran (2,2,5,5-tetramethyl-2,5-disila-1-oxacyclopentane), 1,3-divinyl-1,3-diphenyl-1,3-diphenyl-1,3-dimethyl-disilazane, 1,3-diphenyl-1,1,3,3-tetramethyldisilazane, DI-n-butyltetramethyldisilazane, and bis(ethylamino)dimethylsilane.

Organic Silicon Complex (A) or Organic Silicon Complex Containing Nitrogen (B) Reaction with Titanium Compounds

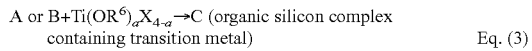

A or B+Ti(OR$^6$)$_a$X$_{4-a}$→C (organic silicon complex containing transition metal)    Eq. (3)

Next, the organic silicon complex (A) or organic silicon complex containing nitrogen (B) is contacted with a transition metal compound, preferably a titanium compound, to form an organic silicon complex containing transition metal (C). The molar ratio of A or B to the titanium compound is preferably from about 0.1 to about 3.0, and more preferably from about 0.5 to about 2.0. The reaction is preferably conducted at about 80° C., and the duration of heating may be from about 30 minutes to about 60 minutes, preferably about 40 minutes, once the desired temperature is obtained, to yield a organic silicon complex containing transition metal (C), which when titanium is employed is typically a brown product. The organic silicon complex containing transition metal (C) can be used, and desirably is used, for the following steps in situ without further separation or characterization.

The transition metal compounds that are acceptable for this process include alkoxytitanium halide compounds having the formula Ti(OR$^6$)$_a$X$_{4-a}$. $R^6$ is a $C_1$-$C_{20}$ hydrocarbon, X is a halogen, and $0<a\leq4$. For present purposes, $R^6$ may be unsubstituted or substituted, including halogen substituted. Each $R^6$ may be the same or different. The titanium compound Ti(OR$^6$)$_a$X$_{4-a}$ may be prepared in situ prepared by reacting a titanium halide compound with Ti(OR$^6$)$_4$ and/or Ti(OR$^6$)$_3$X or by reacting a corresponding alcohol, $R^6$OH, with a titanium halide compound. Alternatively, Ti(OR$^6$)$_a$X$_{4-a}$ may be formed before addition to the reactor by preconditioning a titanium halide compound with Ti(OR$^6$)$_4$ or Ti(OR$^6$)$_3$X or $R^6$OH. Preconditioning may be achieved by mixing a titanium halide compound in hexane with Ti(OR$^6$)$_4$ or Ti(OR$^6$)$_3$X in hexane and stirring at about 75° C. to about 80° C. for about 0.5 hour to about 1 hour, resulting in a Ti(OR$^6$)$_a$X$_{4-a}$ complex.

Examples of the titanium halide compound include TiCl$_4$, TiBr$_4$, TiI$_4$, TiCl$_3$.nTHF, and 3TiCl$_3$.AlCl$_3$. Among these titanium halides, TiCl$_4$, and 3TiCl$_3$.AlCl$_3$ are preferred. Titanium compounds with the structural formula Ti(OR$^6$)$_4$ or Ti(OR$^6$)$_3$X include trimethoxymonochloro-titanium, triethoxyfluorotitanium, triethoxychlorotitanium, tetraethoxytitanium, tripropoxy-fluorotitanium, tripropoxychlorotitanium, tetra-n-propoxytitanium, tetraisopropoxytitanium, tributoxyfluorotitanium, tributoxychlorotitanium, triisobutoxychlorotitanium, tetra-n-butoxytitanium, tetra-isobutoxytitanium, tetra-sec-butoxytitanium, tetra-tert-butoxytitanium, dipentoxydichlorotitanium, tripentoxy-monochlorotitanium, tetra-n-pentyloxytitanium, tetracyclopentyloxytitanium, trioctyloxy-monochlorotitanium, 2-ethylhexoxytitanium trichloride, butoxyctitanium trichloride, tetra-n-hexyloxytitanium, tetracyclohexyloxytitanium, tetra-n-heptyloxytitanium, tetra-n-octyloxy-titanium, tetra-2-ethylhexyloxytitanium, tri-2-ethylhexyloxy-monochlorotitanium, tetranonyloxytitanium, tetradecyloxytitanium, tetraisobornyloxy-titanium, tetra-oleyloxytitanium, tetraallyloxytitanium, tetrabenzyloxytitanium, tetrabenzhydryloxytitanium, triphenoxychlorotitanium, tri-o-xylenoxychlorotitanium, tetraphenoxytitanium, tetra-o-methylphenoxytitanium, tetra-m-methylphenoxytitanium tetra-1-naphthyloxytitanium and tetra-2-naphthyloxytitanium and mixtures thereof. The preferred Ti(OR$^6$)$_4$ or Ti(OR$^6$)$_3$X compounds are 2-ethylhexoxytitanium trichloride, butoxytitanium trichloride, tetra-n-propoxytitanium, tetraisopropoxytitanium, tetra-n-butoxytitanium, tetra-isobutoxytitanium, dibutoxydichlorotitanium, isobutoxytrichlorotitanium, and propoxytrichlorotitanium.

Organic Silicon Complex Containing Transition Metal (C) Reaction with Substituted Aromatic Ring Nitrogen Compound Eq. (4)

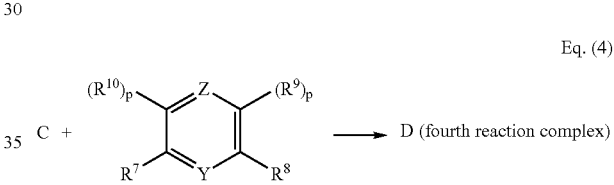

C + → D (fourth reaction complex)

The organic silicon complex containing titanium (C) is further contacted with a substituted aromatic ring nitrogen compound to form fourth reaction complex (D). The substituted aromatic ring nitrogen compound is preferably employed in amounts sufficient to have a molar ratio of substituted aromatic ring nitrogen compound to transition metal compound as added in the previous processing step of typically from about 0.010:1 to about 50:1, preferably from about 0.02:1 to about 10:1, and most preferably from about 0.1:1 to about 5:1. Although the conditions are not generally critical, one acceptable procedure is to heat at about 80° C. for about 30 minutes to about 100 minutes, preferably about 60 minutes, once the desired temperature is obtained to yield fourth reaction complex D, which is generally a dark brown. The fourth reaction complex D can be used, and preferably is used, for the following steps in situ without further separation or characterization.

The substituted aromatic ring nitrogen compounds have the following formula:

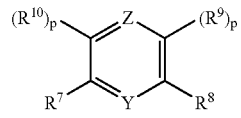

wherein Y is nitrogen, Z is independently either a nitrogen or carbon atom, $R^7$ to $R^{10}$ are independently a 2-position substituted aromatic pyridine ring and/or 2-position substituted pyrimidine ring, and/or 2-position substituted pyrazine, and/or alkyl silane containing 1 to 20 carbon atoms, and/or alkyl and aryl substituent containing 1 to 20 carbon atoms, and/or alkoxy and/or halogen alkyl, and/or hydroxyalkyl, and/or carboxaldehyde, and/or carboxylic acid, and/or acetyl, and/or carboxamide, and both "p" are independently 0 or 1.

Specifically, the substituted aromatic ring nitrogen compounds include substituted dipyridyl, pyrimidine, pyrazine, and terpyridine compounds. Representative examples of the compounds include 2,2':6',2'-terpyridine, 2,2'-dipyridyl, 6,6'-dimethyl-2,2'-dipyridyl, 2,2'-diquinolyl, 4-(p-tolyl)-2,2':6', 2"-terpyridine, 2,6-dimethylpyridine, 2,6-diisopropylpyridine, 2,6-ditertbutylpyridine, 2,4,6-trimethylsilylpyridine, 2,6-dimethoxypyridine, 2,6-bis(chloromethyl)-pyridine, 2,6-dimethypyrazine, 2,3,5-trimethylpyrazine, 2,4,6-trimethyl-s-triazine, 2,3,5,6-tetramethylpyrazine, quinaldine, pyrimidine, pyrazine, pentafluoropyridine, pentachloropyridine, 2,4,6-trimethylpyrimidine, 3-methylpyridazine, 2,6-dimethylpyridazine, 2,6-pyridinecarboxylic acid, 2,6-pyridinediacetate, 2,6-pyridinecarbonyl dichloride, 2,6-pyridinecarboxaldehyde, 2,6-pyridinedicarboxamide, 2,6-pyridinedimetanol, 2,6-pyridinediethanol, 2,6-diacetylpyridine, 2,6-Bis(chloromethyl)pyridine, 2,6-Bis(bromomethyl)pyridine, 2,6-pyridinecarbonitrile, and mixture thereof.

Fourth Reaction Complex (D) Reaction with Magnesium and an Alkyl or Aromatic Halide

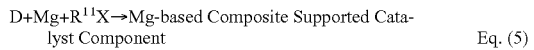

$$D+Mg+R^{11}X \rightarrow \text{Mg-based Composite Supported Catalyst Component} \quad \text{Eq. (5)}$$

The Mg-based composite support catalyst component can be prepared by contacting the fourth reaction complex (D) with in-situ yielded Mg-based composite support for about 3 to about 4 hours. Specifically, the magnesium halide composite support is in situ prepared by reacting metallic magnesium with an alkyl halide or aromatic halide ($R^{11}$) in the presence of the fourth reaction product (D) at a temperature of about 75° C. to about 90° C., preferably about 75° C. to about 80° C. The molar ratio of the alkyl or aromatic halide to metallic magnesium is about 1.0 to about 3.5, preferably about 1.2 to about 2.0. The ratio of the complex D to metallic magnesium is about 0.01 to about 1.5, and preferably about 0.05 to about 0.5. Any type of magnesium powder may be used as the metallic magnesium source. Suitable alkyl or aromatic halides have the formula $R^{11}X$ wherein $R^{11}$ is an alkyl group typically containing 3 to 20 carbon atoms or an aromatic group typically containing 6 to 18 carbon atoms and X is halogen, typically chlorine or bromine. Examples of alkyl or aromatic halides include butylchloride and chlorobenzene.

The magnesium and titanium-based catalyst component is prepared in a non-polar solvent. Suitable non-polar solvents are materials in which all of the reactants used herein, e.g., the silicon compound, the transition metal compound, and electron donors are at least partially soluble and which are liquid at reaction temperatures. Preferred non-polar solvents are saturated hydrocarbons and include alkanes, such as isopentane, hexane, heptane, octane, nonane, and decane. A nitrogen atmosphere may be used to prevent exposure to air.

Activation of the Catalyst Component with a Cocatalyst

The supported catalyst component described above is then activated with cocatalyst, such as alkylaluminum components, to form a catalyst system. The molar ratio of the cocatalyst, such as alkylaluminum to the titanium in the catalyst component is about 0.05 to about 500. The catalyst component may be activated in situ by adding the cocatalyst and catalyst component separately to the polymerization medium. It is also possible to combine the catalyst precursor and cocatalyst before their introduction into the polymerization medium, for example for about 2 hours or less and at a temperature from about 20° C. to about 85° C. Suitable cocatalysts include trimethylaluminum, triethylaluminum, tri (n-propyl)aluminum, tri(isopropyl)aluminum, tri(n-butyl) aluminum, tri(isobutyl)aluminum, tri(t-butyl)aluminum, trihexylaluminum, triamylaluminum, and tri(n-octyl) aluminum. Suitable cocatalysts also include dialkylaluminum hydrides, such as diisobutylaluminum hydride; dialkylaluminum halides, such as dimethylaluminum chloride, diethylaluminum chloride, diisobutylaluminum chloride, di(t-butyl)aluminum chloride and diamylaluminum chloride; alkylaluminum dihalides, such as methylaluminum dichloride, ethylaluminum dichloride, isobutylaluminum dichloride, t-butylaluminum dichloride and arnylaluminum dichloride; dialkylaluminum alkoxides, such as diethylaluminum ethoxide; and alkylalumoxanes, such as tetraethyldialumoxane, tetrabutyldialumoxane, methylalumoxane, and ethylalumoxane. Of all these cocatalysts, trimethyaluminum, triethylaluminum, the mixture of the trialkylaluminum and the dimethylaluminum chloride, tri(isobutyl)aluminum, tri(isopropyl)aluminum, tri(n-octyl) aluminum, and the alkylalumoxane are preferred, and dimethylaluminum chloride and trimethylaluminum are most preferred.

Copolymerization

Ethylene and alpha-olefins may be copolymerized with the catalyst systems prepared according to aspects of the present invention by any suitable process. Such processes include polymerizations carried out in suspension, in solution, or in the gas phase. A preferred method for producing LLDPE resins is a gas phase process, including stirred bed reactors and fluidized bed reactors.

Standard polymerization conditions for production of polyolefins by the method of the invention, such as the polymerization temperature, polymerization time, polymerization pressure, monomer concentration should be selected. Typically, the polymerization temperature should be below the sintering temperature of polymer particles for gas phase polymerization. For the production of ethylene copolymers, an operating temperature of about 30° C. to about 115° C. is acceptable, about 50° C. to about 100° C. is preferred, and about 75° C. to about 95° C. is more preferred. Temperatures of 75° C. to about 90° C. are preferably used to prepare LLDPE products having a density of 0.91 to 0.92; temperatures of about 80° C. to about 100° C. are preferably used to prepare LLDPE products having a density of 0.92 to 0.94; and temperatures of about 90° C. to about 115° C. are used to prepare LLDPE products having a density of 0.94 to 0.96. Molecular weight of the polymers may be suitably controlled with hydrogen when the polymerization is performed using the catalyst system described above. The control of molecular weight may be illustrated by changes in melt indexes ($I_2$ and $I_{21}$) of the polymer.

Copolymerizing the alpha-olefin comonomers with ethylene to achieve 1 to 5 mol percent of the comonomer in the copolymer results in the desired density ranges in the copolymers. The amount of the comonomer needed to achieve this result will depend on the particular comonomer(s) employed. It has been found that when using a gas phase catalytic polymerization reaction, 1-hexene and 4-methyl-1-pentene can be incorporated into ethylene-based copolymer chains with high efficiency. A relatively small concentration of 1-hexene or 4-methyl-1-pentene in the gas phase reactor can lead to a relatively large incorporation of 1-hexene or 4-methyl-1-pentene into the resulting copolymer. For example, 1-hexene or 4-methyl-1-pentene in amount up to 18 percent by weight, preferably 2 to 12 percent by weight, may produce LLDPE resins having a density of less than 0.940 g/cc.

LLDPE resins may be copolymers of ethylene with one or more $C_3$-$C_{10}$ alpha-olefins. Thus, copolymers having two types of monomer units are possible as well as terpolymers having three types of monomer units. Particular examples of such polymers include ethylene/1-butene copolymers, ethylene/1-hexene copolymers, ethylene/4-methyl-1-pentene copolymers, ethylene/1-butene/1-hexene terpolymers, ethylene/propylene/1-hexene terpolymers, and ethylene/propylene/1-butene terpolymers. Particularly preferred co-monomers are 1-hexene, 4-methyl-1-pentene, 1-propylene, 1-butene, and mixture thereof.

Prepolymerization

The solid catalyst component, i.e. the supported catalyst component, may be subjected to pre-polymerization, thereby obtaining a pre-polymerized catalyst component, which is then used for the gas phase polymerization. For example, the solid catalyst component and a cocatalyst component, such as an organoaluminum compound, are contacted with an olefin. Examples of the olefin used for the pre-polymerization are ethylene, propylene and butene-1. The pre-polymerization may be either homo-polymerization or copolymerization. It may be preferable to make slurry containing the solid catalyst component using a solvent. Examples of suitable solvents include aliphatic hydrocarbons such as butane, pentane, hexane and heptanes, and aromatic hydrocarbons such as toluene and xylene. The slurry concentration may typically be about 0.001 to 0.3 g-solid catalyst component/10 ml solvent, and preferably about 0.02 to about 0.2 g-solid catalyst component/10 ml solvent. The organoaluminum compound may be used in a ratio of about 0.1 to about 100, preferably about 0.5 to about 50, calculated as the Al/Ti atomic ratio, that is, the atomic ratio of the Al atom in the organoaluminum compound to the Ti atom in the solid catalyst component. The temperature for the pre-polymerization may generally be about −30° C. to about 100° C., and preferably from about −10° C. to about 85° C. Yield of the pre-polymer is typically about 0.1 g to about 500 g, and preferably about 0.5 g to about 50 g, per mmol of Ti. When used for gas phase polymerization, the pre-polymerized solid catalyst obtained may be combined with inert diluents to form slurry or dried to obtain a flowing powder.

EXAMPLES

To facilitate a better understanding of the present invention, the following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

Example 1

(1) Synthesis of Magnesium-Titanium Based Catalyst Component.

Anhydrous hexane (2 L), magnesium (31.9 g), iodine (3.3 g), isopropanol (3.66 ml), and butyl chloride (5.8 ml) were successively charged into a 5 L reactor equipped with an anchor stirrer driven by a magnetic motor. The reactor was heated to 85° C. within 60 minutes and then cooled to 80° C. within 20 minutes. Tetraethoxy orthosilicate (40 ml, 180.0 mmol) and silicon tetrachloride (14 ml, 122.2 mmol) were added to the reactor and held for reaction at 80° C. for 40 minutes to yield to a yellow-brown first reaction product, organic silicon complex.

Next, 1,1,1,3,3,3-hexamethyldisilazane (15 ml, 71.1 mmol) was introduced to the organic silicon complex at 80° C. for 30 minutes to produce a brown slurry product, organic silicon complex containing nitrogen, which was used without further separation or purification. Ti(OPr)$_4$ (45.5 ml, 165.4 mmol) with TiCl$_4$ (18.3 ml, 166.0 mmol) was charged to the organic silicon complex containing nitrogen at 80° C., and the slurry mixture was stirred for 1 hour to yield product, organic silicon complex containing titanium, followed by the slow introduction of 2,3,5,6-tetramethylpyrazine (22.61 g, 166.0 mmol) in the hexane solution. The reaction was stirred at 80° C. for 1 hour to yield a dark product, fourth reaction complex D, which was used without further separation.

The fourth reaction complex D was contacted with n-butyl chloride (213.3 ml, 2041.5 mmol), which was slowly introduced over 4 hours at 80° C. Following the addition of n-butyl chloride, the reaction mixture was stirred at 80° C. for 2 more hours and then cooled to temperature of 50° C. The resulting precipitate was rapidly washed 3 times with 2L hexane to obtain a solid magnesium-titanium-based catalyst component. Analysis shows that the red/brown catalyst component contains 6.5% Ti and 14.5% Mg, respectively.

(2) Ethylene/1-Hexene Copolymerization.

A 2.0-liter stainless steel autoclave was purged with nitrogen and charged with 1000 mL of dry hexane. Next, 3.0 ml of 1.0 M tri(n-octyl)aluminum and 50 mg of solid catalyst component obtained above were successively introduced into the reactor at 65° C. The internal pressure was increased to 38 psig with hydrogen (29 psi of nitrogen). The reactor was closed, the stirring was increased to 750 rpm, and the internal temperature was raised to 85° C. Then, 120 ml of 1-hexene was charged, followed by charging ethylene to maintain the total pressure at about 90 psig. The co-polymerization was carried out immediately and continued at 85° C. for 40 minutes. Then, the ethylene supply was stopped and reactor was allowed to cool. The copolymer was collected and dried under vacuum at 70° C. for 5 hours. Polymerization results are summarized in Table 1.

Example 2

A solid magnesium-titanium based catalyst component was prepared in the same manner as in Example 1 part (1) except that 2,6-dimethylpyrazine (18.0 g, 166.5 mmol) was used instead of 2,3,5,6-tetramethylpyrazine. The slurry copolymerization in a 2 liter reactor was carried out in the same manner as in Example 1 (2) except using this solid catalyst component. The results are shown in Table 2.

Example 3

A solid magnesium-titanium based catalyst component was prepared and polymerization was performed in the same manner as in Example 1 except that trimethyaluminum (3.0 ml of 2 M) was used instead of tri(n-octyl)aluminum in Example 1 (2). The results are shown in Table 1.

Example 4

A solid magnesium-titanium based catalyst component was prepared and polymerization was carried out in the same manner as in Example 1 except that dimethylaluminum chloride (3.0 ml of 1 M) was used instead of tri(n-octyl)aluminum in Example 1 (2). The results are shown in Table 1.

Comparative Example 1

A catalyst was prepared according to U.S. Pat. No. 4,748, 221, French Patent No. 2,116,698, and European Patent No. 0 703 246 A1. Anhydrous hexane (2 L), magnesium (31.9 g), iodine (3.3 g), isopropanol (3.66 ml), butyl chloride (2.8 ml) was successively charged into a 5 L reactor equipped with an anchor stirrer driven by a magnetic motor. The reactor was heated to 85° C. within 60 minutes and then cooled to 80° C. within 20 minutes. Ti(OPr)$_4$ (45.5 ml, 165.4 mmol) with TiCl$_4$ (18.3 ml, 166.0 mmol) was charged to the reactor, followed by the slow introduction over 4 hours of n-butyl chloride (213.3 ml, 2041.5 mmol) at 80° C. The mixture was stirred for a further 2 hours at 80° C., and then cooled to room temperature. The solid precipitate was washed 3 times with 2L hexane to yield Comparative Catalyst 1. Ehtylene/1-hexene copolymerization was carried out in the same way as in Example 1 except using this solid catalyst component, and the result is listed in Table 1.

Comparative Example 2

A solid catalyst was prepared in the same manner as in Example 1 (1) except that the substituted disilazane and/or substitute disilafuran ($R^4{}_2R^5Si$)$_2$NH, such as 1,1,1,3,3,3-hexamethyldisilazane, and substituted aromatic ring nitrogen compound, such as 2,3,5,6-tetramethylpyrazine, 2,6-dimethylpyrazine, 2,6-dimethoxypyridine, and 2,6-dimethylpyridine, was not used. The polymerization was carried out in the same manner as in Example 1 (2) except using this solid catalyst component. The results are shown in Table 1.

Comparative Example 3

A solid catalyst was prepared in the same manner as in Example 1 (1) except that the substituted aromatic ring nitrogen compound, such as 2,3,5,6-tetramethylpyrazine, 2,6-dimethylpyrazine, 2,6-dimethoxypyridine, and 2,6-dimethylpyridine was not used. The polymerization was carried out in the same manner as in Example 1 (2) except using this solid catalyst component. The results are shown in Table 1.

Comparative Example 4

A catalyst was prepared according to U.S. Pat. No. 6,228, 792B1 except that MgCl$_2$ composite support was used instead of silica as support disclosed in '792 patent.

(1) MgCl$_2$ Composite Support

Anhydrous hexane (2 L), magnesium (31.9 g), iodine (3.3 g), isopropanol (3.66 ml), and butyl chloride (5.8 ml) were successively charged into a 5 L reactor equipped with an anchor stirrer driven by a magnetic motor. The reactor was heated to 85° C. within 60 minutes and then cooled to 80° C. within 20 minutes. Tetraethoxy orthosilicate (40 ml, 180.0 mmol) and silicon tetrachloride (14 ml, 122.2 mmol) were added to the reactor and held for reaction at 80° C. for 40 minutes, followed by the slow introduction over 4 hours of n-butyl chloride (213.3 ml, 2041.5 mmol) at 80° C. The reaction mixture was stirred at 80° C. for 2 more hours and then cooled to room temperature. The resulting precipitate was washed 3 times using 2 L of hexane to obtain the solid magnesium halide composite support.

(2) Preparation of Comparative Catalyst.

The yellow slurry of the support prepared above was treated with the TiCl$_4$ (either neat or as a 20 wt % solution in heptane, 0.52 mmol Ti/g of support), and stirred for 1 hour. Diethylaluminum chloride (DEAC) (3.75 mmol/g of support) was added dropwise, and stirring continued for 2 hours. 2,6-dimethypyridine as electron donor (0.26 mmol/g of support) was added, followed by an additional hour of stirring. Volatiles were removed under vacuum at 50° C. to yield a free-flowing powder. The polymerization was carried out in the same manner as in Example 1 (2) except using this solid catalyst component. The results are shown in Table 1.

Comparative Example 5

A catalyst was prepared according to U.S. Pat. No. 6,228, 792B1. First, 10.0 g of treated silica was slurried in 50 ml of heptane. Dialkyl-magnesium of the type and in the amounts reported in '792 patent was added dropwise as a 15 weight percent solution thereof in heptane, and the slurry was stirred for 1 hour. Anhydrous hydrogen chloride was bubbled through the suspension for 10 minutes (or until an aliquot of the suspension was slightly acidic). Excess HCl was removed by purging the flask with nitrogen for 10 minutes. The yellow/off-white slurry was treated with the TiCl$_4$ (either neat or as a 20 weight percent solution in heptane) in amounts reported in the '792 patent, and stirred for 1 hour. Diethylaluminum chloride (DEAC) was added dropwise, in the amounts (Ti/DEAC ratio was 8.6) reported in the '792 patent, and stirring continued for 2 hours. Electron donor, 2,6-dimethypyridine, in the amounts (Ti/donor ratio=1.0) reported in '792 patent, was added, followed under vacuum at 50° C. to yield a free-flowing powder. The polymerization was performed the same way was as the other Comparative Examples, i.e. the same way as Example 1, except using the solid catalyst component.

TABLE 1

Slurry Phase C2/C6 Copolymerization.

| Example | productivity(*) | $I_{21}$ | MFR | Density (g/cc) | $T_m$ (° C.)(**) |
|---|---|---|---|---|---|
| 1 | 3265 | 1.18 | 27.6 | 0.9162 | 124.5 |
| 2 | 3750 | 1.16 | 26.8 | 0.9182 | 125.2 |
| 3 | 4350 | 1.18 | 27.1 | 0.9160 | 124.3 |
| 4 | 3050 | 0.98 | 26.5 | 0.9168 | 123.5 |
| Comparative 1 | 3984 | 1.28 | 34.5 | 0.9168 | 125.8 |
| Comparative 2 | 1132 | 0.45 | 26.5 | 0.9300 | 128.3 |
| Comparative 3 | 2240 | 0.66 | 27.1 | 0.9286 | 127.5 |
| Comparative 4 | 2127 | 0.78 | 29.6 | 0.9275 | 127.8 |
| Comparative 5 | 2527 | 1.05 | 29.0 | 0.9300 | 127.1 |

(*)Productivity is given in units of gram polymer/gram of catalyst-h-100 psi of ethylene.
(**)Melting point of the resin.
$I_{21}$ is high-load melt index.

Example 5

A solid magnesium-titanium based catalyst component was prepared in the same manner as in Example 1 (1), but ethylene/1-hexene copolymerization was carried out in the gas phase process instead of slurry polymerization by using a pre-polymerized catalyst component.

(1). Pre-Polymerization

Two liters of n-hexane, 48 millimoles of tri(n-octyl)aluminum and a quantity of previously prepared catalyst containing 12.6 millimoles of titanium were introduced into a 5 liter stainless steel reactor maintained under nitrogen atmosphere, provided with a stirring device rotating at 750 revolutions per minute and heated to 68 C. Hydrogen was then introduced to obtain a partial pressure of 0.5 bar, and ethylene was introduced at a steady flow rate of 160 g/h for 3 hours. At the end of this time the reactor was degassed and its contents were transferred into a flask evaporator in which the n-hexane was removed under vacuum followed by nitrogen heating to 40-50° C. After evaporation, 480 g of prepolymer containing 42.0 g polyethylene per millimole of titanium were obtained as a pre-polymerized catalyst component, which was then used for the gas phase polymerization.

(2). Gas Phase Copolymerization of Ethylene and 1-Hexene

Co-polymerization was carried out in a 10 liter autoclave designed for stirred gas phase polymerization, equipped with an anchor stirrer with magnetic stirrer drive above the top of autoclave and a valve at the base of the autoclave to withdraw polymer. The temperature was regulated using steam/water via the outer jacket of the autoclave. A fluidized seed particle of polymer (200 g) and a quantity of previously prepared prepolymer (30-50 g) with a Al/Ti molar ratio of 2.5 were introduced into the 10 liter gas phase polymerization reactor maintained under nitrogen atmosphere, provided with a stirring device rotating at 150 revolutions per minute and heated to 68° C. Nitrogen (4 bar), and hydrogen (1.0) were charged into the reactor to provide total pressure of 5 bars. After the reactor temperature was raised to 80° C., ethylene was charged into the reactor to obtain total pressure of 10 bar, together with 1-hexene ($C_6$) at $C_6/C_2$ molar ratio of 0.0784. The copolymerization was maintained at 85° C. The feed of $C_6/C_2$ was continued at a $C_6/C_2$ molar ratio of 0.0784 until 1000 grams of ethylene was consumed during the gas phase polymerization. The reactor was then cooled down and degassed and an ethylene/1-hexene polymer free from agglomerate was drawn off, which had a density of 0.9180, a melt index $MI_{2.16}$ of 1.009 g/10 minutes. The result is shown in Table 2.

Example 6

A solid magnesium-titanium based catalyst component was prepared in the same manner as in Example 1(1) except that 2,6-dimethylpyrazine (18.0 g, 166.5 mmol) was used instead of 2,3,5,6-tetramethylpyrazine. The gas phase copolymerization in 10 liter reactor was performed in the same manner as in Example 5 except using this solid catalyst component and corresponding pre-polymerized catalyst component. The results are shown in Table 2.

Examples 7-13

A solid magnesium-titanium based catalyst component was prepared and polymerization was performed in the same manner as in Example 6 except that the polymerization conditions of stirred gas phase were varied by changing $H_2/C_2$ and $C_6/C_2$ molar ratio. The results are shown in Table 2.

Example 14

A solid magnesium-titanium based catalyst component was prepared in the same manner as in Example 1(1) except that 2-ethylhexoxytitanium trichloride (166.0 mmol) was used instead of $Ti(OPr)_4$ and $TiCl_4$. The gas phase copolymerization in 10 liters reactor was performed in the same manner as in Example 5 except using this solid catalyst component and corresponding pre-polymerized catalyst component. The results are shown in Table 2.

Example 15

A solid magnesium-titanium based catalyst component was prepared in the same manner as in Example 1(1) except that n-propoxytitanium trichloride (166.0 mmol) was used instead of $Ti(OPr)_4$ and $TiCl_4$, and gas phase copolymerization was performed in the same manner as in Example 5 except using this solid catalyst component and corresponding pre-polymerized catalyst component. The results are shown in Table 2.

Example 16

A solid magnesium-titanium based catalyst component was prepared in the same manner as in Example 1(1) except that 2,6-dimethoxypyridine (23.1 ml, 166.0 mmol) and n-propoxytitanium trichloride (166.0 mmol) were used instead of 2,3,5,6-tetramethylpyrazine, and $Ti(OPr)_4$ with $TiCl_4$. The gas phase copolymerization in a 10 liter reactor was performed in the same manner as in Example 5 except using this solid catalyst component and corresponding pre-polymerized catalyst component. The results are shown in Table 2.

Example 17

A solid magnesium-titanium based catalyst component was prepared in the same manner as in Example 1(1) except that 2,6-dimethylpyridine (19.5 ml, 167.4 mmol) and n-propoxytitanium trichloride (166.0 mmol) were used instead of 2,3,5,6-tetramethylpyrazine and $Ti(OPr)_4$ with $TiCl_4$. The gas phase copolymerization in a 10 liter reactor was performed in the same manner as in Example 5 except using this solid catalyst component and corresponding pre-polymerized catalyst component. The results are shown in Table 2.

Example 18

A solid magnesium-titanium based catalyst component was prepared in the same manner as in Example 1(1) except that the substituted disilazane and/or substitute disilafuran $(R^4{}_2R^5Si)_2NH$ such as 1,1,1,3,3,3-hexamethyldisilazane was not used. The gas phase copolymerization in a 10 liter reactor was performed in the same manner as in Example 5 except using this solid catalyst component and corresponding pre-polymerized catalyst component. The results are shown in Table 2.

Comparative Examples 6-8

A solid catalyst was prepared in the same manner as in Comparative Example 1. The gas phase copolymerization in 10 liter reactor was performed instead of slurry polymerization, in the same manner as in Example 5 except using this solid catalyst component and corresponding pre-polymerized catalyst component. The results are shown in Table 2.

Comparative Example 9

A solid catalyst was prepared in the same manner as in Comparative Example 2. The gas phase copolymerization in a 10 liter reactor was performed instead of slurry polymerization, in the same manner as in Example 5 except using this solid catalyst component and corresponding pre-polymerized catalyst component. The results are shown in Table 2.

Comparative Example 10

A solid catalyst was prepared in the same manner as in Comparative Example 3. The gas phase copolymerization in 10 liters reactor was performed instead of slurry polymerization, in the same manner as in Example 5 except using this solid catalyst component and corresponding pre-polymerized catalyst component. The results are shown in Table 2.

Comparative Example 11

A catalyst was prepared in the same manner as in Comparative Example 4. The gas phase copolymerization in 10 liters reactor was performed instead of slurry polymerization, in the same manner as in Example 5 except using this solid catalyst component and corresponding pre-polymerized catalyst component. The results are shown in Table 2.

Comparative Example 12

A catalyst was prepared in the same manner as in Comparative Example 5. The gas phase copolymerization in 10 liters reactor was performed instead of slurry polymerization, in the same manner as in Example 5 except using this solid catalyst component and corresponding pre-polymerized catalyst component. The results are shown in Table 2.

Examples 19-21

A solid magnesium-titanium based catalyst component was prepared and polymerization was performed in the same manner as in Example 5 except that 1-butene was used instead of 1-hexene. The polymerization conditions of stirred gas phase were varied by changing $H_2/C_2$ and $C_4/C_2$ ratio. The results are shown in Table 3.

Comparative Examples 12-13

A solid catalyst was prepared in the same manner as in Comparative Example 1. The gas phase copolymerization in a 10 liter reactor was performed in the same manner as in Comparative Example 5 except using 1-butene as a comonomer to replace 1-hexene. The polymerization conditions of stirred gas phase were varied by changing $H_2/C_2$ and $C_4/C_2$ ratio. The results are shown in Table 3.

Comparative Example 14

A solid catalyst was prepared in the same manner as in Comparative Example 2, without using aminosilane or titanium compounds. The stirred gas phase copolymerization in 10 liters reactor was performed in the same manner as in Comparative Example 8 except using 1-butene to replace 1-hexene as a comonomer. The results are shown in Table 3.

TABLE 2

Stirred Gas Phase Ethylene/1-Hexene (C2/C6) Copolymerization.

| Example | $C_6/C_2$ (*) | $H_2/C_2$ () | productivity(*) | $I_{21}$ | MFR | Density (g/cc) |
|---|---|---|---|---|---|---|
| 6 | 0.0784 | 0.20 | 1120 | 0.96 | 27.1 | 0.9177 |
| 7 | 0.0672 | 0.20 | 1135 | 0.99 | 26.7 | 0.9201 |
| 8 | 0.0895 | 0.26 | 1067 | 1.86 | 27.3 | 0.9164 |
| 9 | 0.0895 | 0.20 | 1104 | 1.07 | 27.6 | 0.9153 |
| 10 | 0.1007 | 0.20 | 1133 | 1.14 | 28.6 | 0.9129 |
| 11 | 0.0336 | 0.34 | 1250 | 1.94 | 23.5 | 0.9349 |
| 12 | 0.0336 | 0.36 | 1205 | 2.40 | 23.6 | 0.9338 |
| 13 | 0.0895 | 0.28 | 1025 | 2.48 | 27.3 | 0.9172 |
| 14 | 0.0784 | 0.20 | 1032 | 1.10 | 27.5 | 0.9174 |
| 15 | 0.0784 | 0.20 | 1075 | 1.17 | 26.8 | 0.9181 |
| 16 | 0.0895 | 0.20 | 926 | 1.03 | 29.1 | 0.9175 |
| 17 | 0.0784 | 0.20 | 1186 | 1.01 | 27.7 | 0.9180 |
| 18 | 0.0784 | 0.20 | 1250 | 1.19 | 27.6 | 0.9174 |
| Comparative 6 | 0.0784 | 0.16 | 1206 | 1.09 | 32.5 | 0.9207 |
| Comparative 7 | 0.0895 | 0.16 | 1109 | 1.05 | 34.0 | 0.9185 (fouling reactor) |
| Comparative 8 | 0.0895 | 0.20 | 1009 | 1.72 | 33.6 | 0.9167 (chunk formation, fouling reactor) |
| Comparative 9 | 0.0895 | 0.20 | 780 | 0.54 | 30.2 | 0.9237 |
| Comparative 10 | 0.0895 | 0.20 | 1050 | 0.75 | 30.5 | 0.9213 |
| Comparative 11 | 0.0895 | 0.20 | 678 | 1.27 | 31.5 | 0.9255 |
| Comparative 12 | 0.0895 | 0.20 | 1078 | 0.95 | 30.3 | 0.9285 |

(*)1-Hexene/Ethylene molar ratio in the gas phase.
(**)Hydrogen/ethylene molar ratio in the gas phase.
(***)Productivity in units of gram polymer/gram catalyst/h.

TABLE 3

Stirred Gas Phase Ethylene/1-Butene (C2/C4) Copolymerization.

| Example | productivity(*) | $I_{21}$ | MFR | Density (g/cc) |
|---|---|---|---|---|
| 19 | 1105 | 1.98 | 24.5 | 0.9186 |
| 20 | 1204 | 2.34 | 23.8 | 0.9163 |
| 21 | 1154 | 0.64 | 25.6 | 0.9180 |
| Comparative 12 | 1203 | 1.35 | 32.2 | 0.9183 |
| Comparative 13 | 1045 | 1.52 | 32.5 | 0.9165 (chunk formation, fouling reactor |
| Comparative 14 | 655 | 0.593 | 27.9 | 0.9265 |

(*)Productivity in units of gram polymer/gram catalyst/h.

As shown in Tables 1-3, the catalyst composition shows desirable catalyst activity and comonomer response as well as narrow molecular weight distribution for the both slurry and stirred gas phase copolymerization of ethylene and alpha-olefins. The combination of the catalyst with cocatalyst such as trimethylaluminum (TMA) and dimethylaluminum chloride (DMAC), particular dimethylaluminum chloride, to form a catalyst system results in improved branching compositional distribution, as evidenced by the melting point of DSC tests.

The magnesium-titanium-based catalyst in the Comparative Example 1, 5-7, and 11-12 had poor catalyst morphology and produced LLDPE resin with broader molecular weight distribution and higher content of lower molecular weight fraction, which significantly deteriorate LLDPE film properties in the commercial film applications. In particular, it is difficult for this catalyst composition to produce LLDPE with a density of less than 0.917 at high catalyst productivity rates because of poor powder flowability caused by resin stickiness, chunk formation, and reactor fouling.

The catalysts based on the U.S. Pat. No. 4,748,221, prepared by using $Si(OEt)_4/SiCl_4$ as electron donor without using the aminosilane and titanium compounds of the present invention in the catalyst preparation process (Comparative Examples 2-3, 8-9, and 13) show improved narrow molecular weight distribution, but result in poor comonomer response and hydrogen response that are so poor that the target LLDPE products could not be produced.

The catalyst in the Comparative Example 4 and Comparative Example 10 results in poor comonomer response and broad molecular weight distribution for the copolymerization of ethylene and alpha-olefins. These results indicate that the inventive catalyst compositions in Examples 2, and 6-13 are clearly different from and advantageous over what taught in U.S. Pat. No. 6,228,792B1, even though both contain 2,6-methylpyridine compound in the catalyst composition. The catalyst composition as suggested by the '792 patent shows narrow molecular weight distribution and high bulk density for ethylene homo-polymerization only. For ethylene/alpha-olefins copolymerization, the catalyst composition in '792 patent shows poor comonomer response and broad molecular weight distribution.

The molecular weight distribution of the polymers prepared in the presence of the catalysts of the present invention, as expressed by MFR value, that is the ratio of the high-load melt index ($I_{21}$) to the melt index ($I_2$), varies from about 20 to 32, and is preferably 24-29, for LLDPE products having a density of about 0.900 to about 0.940 g/cc and an $I_2$ (value) of about 0.1 to about 100. These MFR values indicate a relatively narrow molecular weight distribution of the polymers. The relatively low MFR values of polymers prepared with the catalysts of this invention also indicate that they are suitable for the preparation of various film products since such films are likely to have excellent strength properties. Increasing the molecular weight, narrowing molecular weight distribution (MWD), or lowering the density of LLDPE result in improved impact strength and puncture resistance properties. At a given molecular weight and density of polymer, further narrowing molecular weight distribution of polymer results in improved clarity and toughness of film products.

The advantages of the high activity magnesium-titanium-based catalyst composition of the present invention include that it is simple and economical to synthesize, it is effective to copolymerize ethylene and alpha-olefin with improved comonomer response, and it is capable of producing ethylene/alpha-olefin copolymers such as LLDPE having a narrow molecular weight distribution, narrow/uniform compositional distribution, and reduced solvent extractable fraction or reduced low molecular weight component. The catalysts have desirable morphology and narrow particle size distributions. The catalysts are capable of producing LLDPE resins at high catalyst efficiencies in a fluid bed gas-phase reactor process without resin stickiness, chunk formation, and reactor fouling. In addition, the highly active support catalyst system of this invention yields products having narrow particle size distribution, good flowability, and high bulk density, which are very desirable from a view point of operation stability and efficiency.

This catalyst system is useful for copolymerizing ethylene/higher alpha-olefins with improved comonomer incorporation, and is efficient for producing the ethylene copolymer having a narrow molecular weight distribution and narrow/uniform compositional distribution. The process using the catalyst system described above produces ethylene co-polymers having narrow molecular weight distribution and improved branching distribution. The process advantages may be observed if the process is a gas-phase, slurry, or solution process.

The combination of the described catalyst component with the cocatalyst such as dimethylaluminum chloride and trimethylaluminum produces polymerization catalyst compositions which can copolymerize ethylene and alpha-olefins to form copolymers with a substantially improved branching distribution. The more uniform branching distribution is shown by the ethylene copolymers made with the catalyst of this invention have crystalline melting point about 1-2° C., which is lower than those of polymers made with same catalyst but activated with triethylaluminum and tri(n-octyl)aluminum. A decrease in melting point indicates a substantially improved distribution of side chain branches among the copolymer molecules. Dimethylaluminum chloride is more effective than trimethylaluminum cocatalyst to improve this branching distribution.

The catalysts of the present invention are particularly useful for the production of LLDPE resins. Such LLDPE resins may have a density between 0.900 to 0.945 g/cc, preferably 0.94 g/cc or less, more preferably 0.930 or less, or even 0.914 g/cc or less. Using the catalyst of the present invention, it is possible to achieve densities of less than 0.910 g/cc. The copolymer made by this catalyst has a low content of a lower molecular weight component, as evidenced by the lower content of hexane-soluble portion by Soxhlet extraction test. An ethylene copolymer having better particle property can be produced, while almost no polymer adheres to a polymerization reactor and no chunk forms in the reactor, even at the polymer density as low as 0.90 g/cc.

The in situ catalyst synthesis method and resulting catalyst composition as described above have the uniform and homogeneous active sites for ethylene/alpha-olefin copolymerization. In particular, enhanced co-monomer response and incorporation with the catalyst composition significantly reduces polymer density of the product LLDPE with lower ratio of alpha-olefins to ethylene. This indicates advantages, including producing polyethylene film with physical properties such as resistance to tearing and puncturing compared to a film made from similar resins of higher densities. High co-monomer response and incorporation are important in the gas-phase fluid bed process, because relatively high concentrations of higher alpha-olefin in the fluid-bed reactor result in poor fluidization including resin stickiness.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values is to be understood as referring to all values encompassed within the broader range. Also, the terms in the claims have their plain, ordinary meaning unless otherwise explicitly and clearly defined by the patentee.

What is claimed is:

1. A catalyst component prepared by:
   (i) contacting compound having the formula $R^1_xSiX_y$, wherein $R^1$ is $C_1$-$C_{20}$ hydrocarbyl, X is halogen, x=0-3, y=1-4, and x+y=4, and wherein each X and each $R^1$ may be the same or different, with at least one compound having the formula $R^2_mSi(OR^3)_n$, wherein $R^2$ and $R^3$ are independently $C_1$-$C_{20}$ hydrocarbyl, m=0-3, n=1-4, and m+n=4, and wherein each $R^2$ may be the same or different and each $R^3$ may be the same or different, thereby forming organic silicon complex (A);
   (ii) optionally, contacting the organic silicon complex (A) with a compound having the formula $(R^4_2R^5Si)_2NH$ wherein $R^4$ is alkyl or aryl and $R^5$ is cyclic alkyl, and wherein each R4 may be the same of different, thereby forming organic silicon complex containing nitrogen (B);
   (iii) contacting the organic silicon complex (A) or the organic silicon complex containing nitrogen (B) with a compound having the formula $Ti(OR^6)_aX_{4-a}$, wherein $R^6$ is $C_1$-$C_{20}$ hydrocarbyl, X is halogen, and 0<a≦4, and wherein each R6 may be the same or different, thereby forming organic silicon complex containing titanium (C);
   (iv) contacting the organic silicon complex containing titanium (C) with a compound having the formula

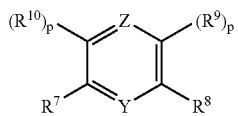

wherein Y is nitrogen, Z is nitrogen or carbon, $R^7$, $R^8$, $R^9$, and $R^{10}$ are independently selected from the group consisting of 2-position substituted aromatic pyridine ring group, 2-position substituted pyrimidine ring group, 2-position substituted pyrazine group, alkyl silane group containing 1 to 20 carbon atoms, alkyl group containing 1 to 20 carbon atoms, aryl group containing 1 to 20 carbon atoms, alkoxy group, haloalkyl group, hydroxyalkyl group, carboxaldehyde group, carboxylic acid group, acetyl, and carboxamide group, and each p independently is 0 or 1, thereby forming fourth reaction complex (D); and
   (v) contacting the fourth reaction complex (D) with magnesium-based composite support prepared in-situ by contacting metallic magnesium with alkyl halide or aromatic halide in the presence of fourth reaction complex (D), thereby forming the catalyst component.

2. The catalyst component of claim 1, wherein the compound having the formula $R^1_xSiX_y$ is selected from the group consisting of tetrachlorosilane, allyltrichlorosilane, ethyltrichlorosilane, methyltrichlorosilane, and dichlorodiphenylsilane.

3. The catalyst component of claim 1, wherein the compound having the formula $R^2_mSi(OR^3)_n$ is selected from the group consisting of tetramethoxysilane, tetraethoxysilane, tetraisopropoxysilane, tetrapropoxysilane, tetrabutoxysilane, tetraisobutoxysilane, and combination thereof.

4. The catalyst component of claim 1, wherein the molar ratio of $R^2_mSi(OR^3)_n$ to $R^1_xSiX_y$ is from about 0.5 to about 3.0.

5. The catalyst component of claim 1, wherein the molar ratio of $R^2_mSi(OR^3)_n$ to $R^1_xSiX_y$ is from about 0.8 to about 1.5.

6. The catalyst component of claim 1, wherein step (i) is conducted in the presence of a non-polar solvent at from about 50° C. to about 100° C.

7. The catalyst component of claim 1, wherein the compound having the formula $(R^4_2R^5Si)_2NH$ comprises a substituted disilazane or substituted disilafuran selected from the group consisting of 1,1,1,3,3,3-hexamethyldisilazane, 1,1,3,3-tetramethylsilazane, tetramethyldilafuran (2,2,5,5-tetramethyl-2,5-disila-1-oxacyclopentane), 1,3-divinyl-1,3-diphenyl-1,3-diphenyl-1,3-dimethyl-disilazane, 1,3-diphenyl-1,1,3,3-tetramethyldisilazane, DI-n-butyltetramethyl-disilazane, and bis(ethylamino)-dimethylsilane.

8. The catalyst component of claim 1, wherein step (ii) is conducted at from about 75° C. to about 85° C.

9. The catalyst component of claim 1, wherein the molar ratio of $(R_2^4R^5Si)_2NH$ to $R^1_xSiX_y$ is from about 0.1 to about 3.0.

10. The catalyst component of claim 1, wherein the compound having the formula $Ti(OR^6)_aX_{4-a}$ is prepared by reacting $Ti(OR^6)_4$, or $Ti(OR^6)_3X$ with a titanium halide compound or by reacting $R^6OH$ with a titanium halide compound.

11. The catalyst component of claim 1, wherein $Ti(OR^6)_aX_{4-a}$ is prepared in situ during step (iii).

12. The catalyst component of claim 10, wherein the titanium halide compound is selected from the group consisting of $TiCl_4$, $TiBr_4$, and $3TiCl_3 \cdot AlCl_3$.

13. The catalyst component of claim 1, wherein $Ti(OR^6)_aX_{4-a}$ is selected from the group consisting of butoxytitanium trichloride, tetra-n-propoxytitanium, tetraisopropoxytitanium, tetra-n-butoxytitanium, tetra-isobutoxytitanium, dibutoxydichlorotitanium, isobutoxytrichlorotitanium, n-propoxytrichlorotitanium, and 2-ethylhexoxytitanium trichloride.

14. The catalyst component of claim 1, wherein step (iii) is conducted for from about 30 minutes to about 60 minutes at about 80° C.

15. The catalyst component of claim 1, wherein the compound having the formula

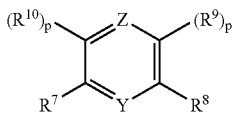

is selected from the group consisting of dipyridyl, pyrimidine, pyrazine, and terpyridine compounds.

16. The catalyst component of claim 1, wherein the compound having the formula

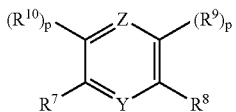

is selected from the group consisting of 2,2':6',2''-terpyridine, 2,2'-dipyridyl, 6,6'-dimethyl-2,2'-dipyridyl, 2,2'-diquinolyl, 4-(p-tolyl)-2,2':6',2''-terpyridine, 2,6-dimethylpyridine, 2,6-ditertbutylpyridine, 2,4,6-trimethylsilylpyridine, 2,6-dimethoxypyridine, 2,6-bis(chloromethyl)-pyridine, 2,6-dimethypyrazine, 2,3,5-trimethylpyrazine, 2,4,6-trimethyl-s-triazine, 2,3,5,6-tetramethylpyrazine, quinaldine, pyrimidine, pyrazine, pentafluoropyridine, pentachloropyridine, 2,4,6-trimethylpyrimidine, 3-methylpyridazine, 2,6-ditertbutylpyridazine 2,6-dimethylpyridazine, 2,6-pyridinecarboxylic acid, 2,6-pyridinediacetate, 2,6-pyridinecarbonyl dichloride, 2,6-pyridinecarboxaldehyde, 2,6-pyridinedicarboxamide, 2,6-pyridinedimetanol, 2,6-pyridinediethanol, 2,6-diacetylpyridine, 2,6-Bis(chloromethyl)pyridine, 2,6-Bis(bromomethyl)pyridine, 2,6-pyridinecarbonitrile, and mixtures thereof.

17. The catalyst component of claim 1, wherein the molar ratio of compound having the formula

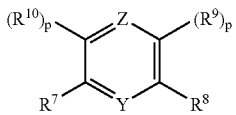

to titanium in $Ti(OR^6)_aX_{4-a}$ is from about 0.010:1 to about 50:1.

18. The catalyst component of claim 1, wherein the ratio of fourth reaction complex (D) to metallic magnesium is from about 0.01 to about 1.5.

19. The catalyst component of claim 1, wherein the molar ratio of the alkyl or aromatic halide to metallic magnesium is from about 1.0 to about 3.5.

20. The catalyst component of claim 1, wherein the alkyl or aromatic halide of step (v) is selected from the group consisting of butylchloride and chlorobenzene.

21. A process for copolymerizing ethylene and alpha-olefin comprising polymerizing ethylene and alpha-olefin in the presence of the catalyst component of claim 1, which has been activated by contacting the catalyst component with cocatalyst.

22. The process of claim 21, wherein the cocatalyst comprises an organoaluminum compound.

23. The process of claim 22, wherein the organoaluminum compound is selected from the group consisting of trimethylaluminum, triethylaluminum, tri-iso-propylaluminum, tri(n-octyl)aluminum, dimethyaluminum chloride, and mixtures thereof.

24. The process of claim 22, wherein the molar ratio of the organoaluminum compound to titanium in the catalyst component is from about 0.05 to about 500.

25. The process of claim 21, wherein the catalyst component is prepolymerized in the presence of the cocatalyst and ethylene prior to copolymerizing ethylene and alpha-olefin.

26. A process for preparing a catalyst component useful for the co-polymerization of ethylene and alpha-olefin comprising:

(i) contacting compound having the formula $R^1_xSiX_y$, wherein $R^1$ is $C_1$-$C_{20}$ hydrocarbyl, X is halogen, x=0-3, y=1-4, and x+y=4, and wherein each X and each $R^1$ may be the same or different, with at least one compound having the formula $R^2_mSi(OR^3)_n$, wherein $R^2$ and $R^3$ are independently $C_1$-$C_{20}$ hydrocarbyl, m=0-3, n=1-4, and m+n=4, and wherein each $R^2$ may be the same or different and each $R^3$ may be the same or different, thereby forming organic silicon complex (A);

(ii) optionally, contacting the organic silicon complex (A) with a compound having the formula $(R^4_2R^5Si)_2NH$ wherein $R^4$ is alkyl or aryl and $R^5$ is cyclic alkyl, and wherein each R4 may be the same of different, thereby forming organic silicon complex containing nitrogen (B);

(iii) contacting the organic silicon complex (A) or the organic silicon complex containing nitrogen (B) with a compound having the formula $Ti(OR^6)_aX_{4-a}$, wherein $R^6$ is $C_1$-$C_{20}$ hydrocarbyl, X is halogen, and $0<a\leq4$, and wherein each R6 may be the same or different, thereby forming organic silicon complex containing titanium (C);

(iv) contacting the organic silicon complex containing titanium (C) with a compound having the formula

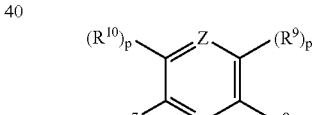

wherein Y is nitrogen, Z is nitrogen or carbon, $R^7$, $R^8$, $R^9$, and $R^{10}$ are independently selected from the group consisting of 2-position substituted aromatic pyridine ring group, 2-position substituted pyrimidine ring group, 2-position substituted pyrazine group, alkyl silane group containing 1 to 20 carbon atoms, alkyl group containing 1 to 20 carbon atoms, aryl group containing 1 to 20 carbon atoms, alkoxy group, haloalkyl group, hydroxyalkyl group, carboxaldehyde group, carboxylic acid group, acetyl, and carboxamide group, and each p independently is 0 or 1, thereby forming fourth reaction complex (D); and (v) contacting the fourth reaction complex (D) with magnesium-based composite support prepared in-situ by contacting metallic magnesium with alkyl halide or aromatic halide in the presence of fourth reaction complex (D), thereby forming the catalyst component.

* * * * *

UNITED STATES PATENT AND TRADEMARK OFFICE
CERTIFICATE OF CORRECTION

PATENT NO. : 7,618,913 B2
APPLICATION NO. : 11/513803
DATED : November 17, 2009
INVENTOR(S) : Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 665 days.

Signed and Sealed this

Twenty-sixth Day of October, 2010

David J. Kappos
*Director of the United States Patent and Trademark Office*